United States Patent [19]

Mennella et al.

[11] 4,449,853

[45] May 22, 1984

[54] FLEXIBLE SLEEVE ELBOW FOR GAS SERVICE LINES

[76] Inventors: Robert J. Mennella, 252-48 60th Ave., Little Neck, N.Y. 11362; David Davidowitz, 17 Colts Brook Rd., Marlboro, N.J. 07746

[21] Appl. No.: 483,667

[22] Filed: Apr. 11, 1983

[51] Int. Cl.³ .............................................. F16L 5/00
[52] U.S. Cl. .................................... 405/184; 138/114; 405/154
[58] Field of Search ................ 405/154, 158, 174–184; 138/114, 111, 118, 121; 210/163

[56] References Cited

U.S. PATENT DOCUMENTS

| 2,246,012 | 6/1941 | Sanders | 210/163 |
|---|---|---|---|
| 2,475,635 | 7/1949 | Parsons | 138/114 X |
| 2,727,811 | 12/1955 | Bunnell | 138/111 X |
| 3,110,922 | 11/1963 | Senne | 138/118 X |
| 3,299,417 | 1/1967 | Sibthorpe | 138/114 X |
| 3,838,713 | 10/1974 | Tubbs | 138/121 X |
| 3,934,617 | 1/1976 | Henderson | 138/114 |
| 4,009,739 | 3/1977 | Weatherford | 138/114 X |
| 4,122,968 | 10/1978 | Germain | 138/114 X |
| 4,132,083 | 1/1979 | McGrath | 405/184 |

FOREIGN PATENT DOCUMENTS 33798 10/1934 Netherlands .................. 405/184

Primary Examiner—Dennis L. Taylor
Attorney, Agent, or Firm—Brooks, Haidt, Haffner & Delahunty

[57] ABSTRACT

A method of installing a gas service line in a building or the like is described, in which a flexible sleeve elbow unit is snaked through a small hole in the building ground slab, downwardly through a narrow passage dug out from the earthen fill beneath the slab, and whereupon it is flexed at approximately 90° to pass horizontally through an aperture in the building foundation wall, to where it is connected to the underground gas service line exterior of the building. The flexible sleeve elbow unit has an inner, gas carrier pipe of corrugated stainless steel, and an outer corrugated stainless steel casing pipe surrounding the corrugated length portion of the gas carrier pipe, providing an annular space therebetween to contain any gas leaking through the carrier.

3 Claims, 4 Drawing Figures

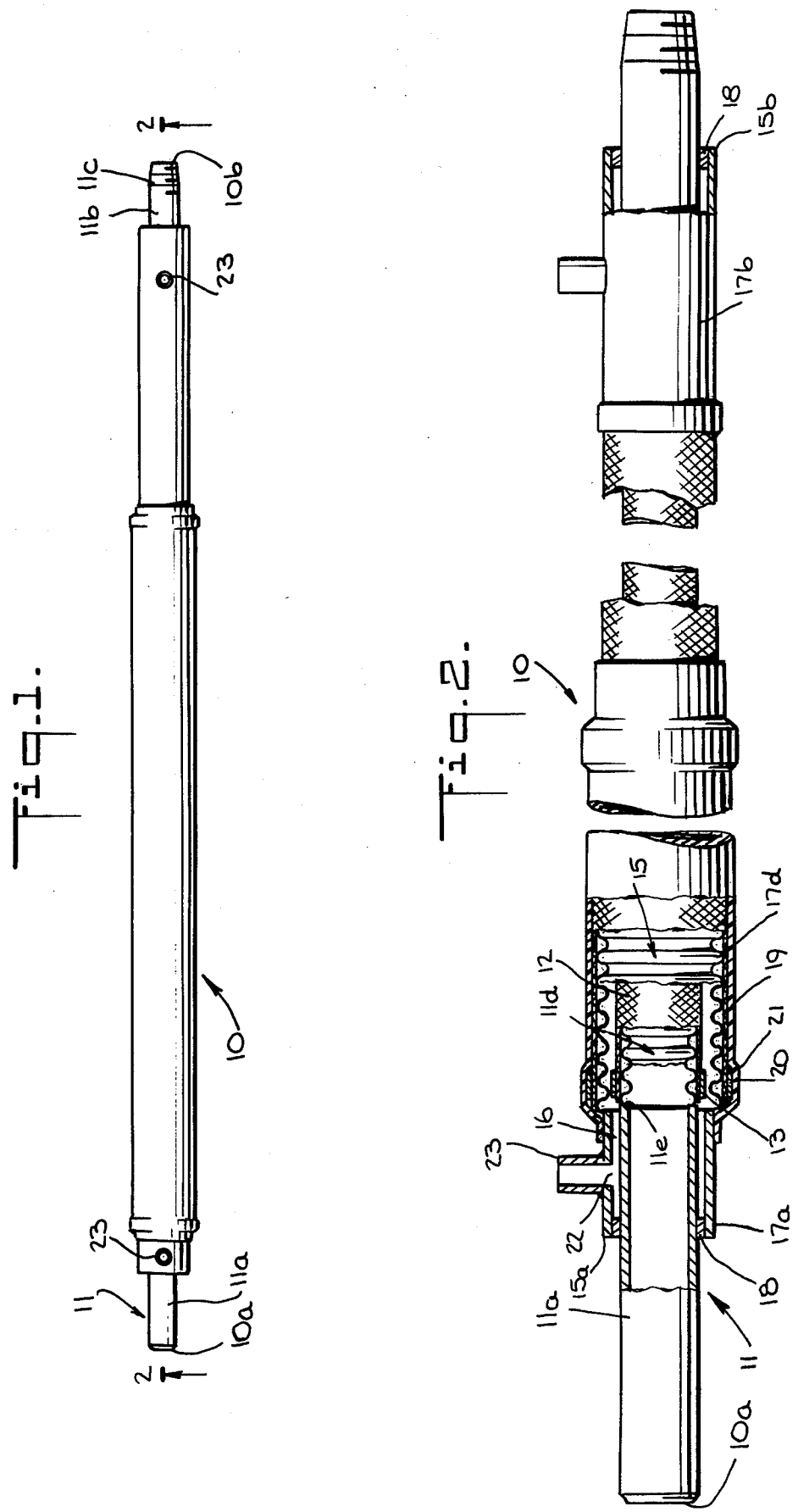

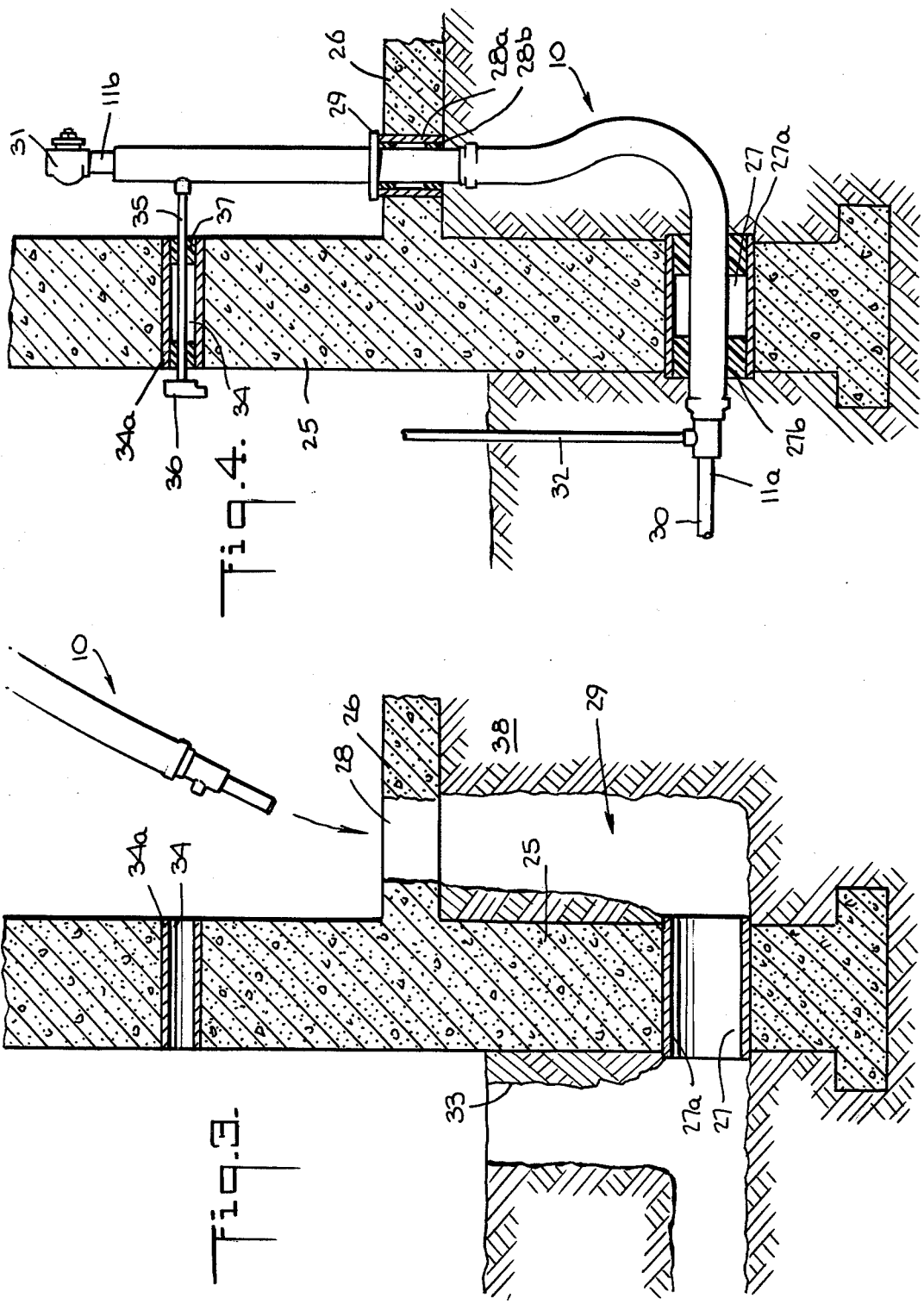

FLEXIBLE SLEEVE ELBOW FOR GAS SERVICE LINES

FIELD OF THE INVENTION

This invention relates to the installation of underground gas utility service lines which supply natural gas to buildings such as private residences or the like, especially those not having cellars. More particularly, it relates to techniques for providing the required gas-tight encasement of that portion of the service line which passes through the wall and floor of the building.

BACKGROUND OF THE INVENTION AND THE PRIOR ART

Where an underground gas service line is installed leading into a building, applicable federal, state and local laws or Codes require that it be encased in a gas-tight conduit or sleeve along that portion of its length which passes through the building foundation wall and ground slab, to where it emerges within the building. An annular space must be provided between the enclosed gas service line and the exterior sleeve to receive and contain any gas which leaks from the service line within this length, thus to prevent gas leakage into the building, or into any space beneath the building. In addition, a vent line must extend from the annular sleeve space to a point above grade and exterior of the building, to permit the gas to escape to the atmosphere where it will not present a hazard.

In the past, the sleeved portion of the gas service line has been pre-fabricated in the form of a rigid, double-wall elbow pipe section having an appropriate vent aperture at least at the upper end, and sometimes also at the lower end of the sleeve, for venting any escaping gas. The required enlarged horizontal opening through the building wall to receive the sleeve at the proper below-grade elevation is usually provided at the time when the wall is poured of concrete. The elbow sleeve is positioned in the wall opening and sealed with the sealing material, whereupon the area is backfilled to the floor elevation. The ground slab is then poured with the elbow sleeve projecting therethrough. In the usual installation, the pipe vent extends horizontally from the vent aperture at the top of the sleeve, passing through a second horizontal opening through the building wall, and any lower vent pipe is located exteriorly of the building, projecting upwardly above grade from the lower vent aperture of the sleeve, which is underground.

When the sleeved elbow must be replaced, it has been necessary to break out a large diameter opening through the concrete ground slab which is the lowermost floor of the building, and to remove a large volume of earthen fill beneath the floor several feet down to the elevation where the sleeve must pass horizontally through the building foundation wall, whereupon the old sleeved elbow may be removed. The replacement elbow is then positioned, the large hole is backfilled, and the large opening in the floor is repaved. In some instances water conduits or drainage pipes may have been installed subsequent to the original gas service, their presence making it even more difficult to install the replacement elbow.

It is intended by the present invention to substantially reduce the size of the break-out hole, and thus the number of man-hours required for the replacement of the referred to sleeved elbow in a gas service line. For example, using the present invention only a one-foot diameter hole through the ground slab is required, as compared with the usual 3'×3', or at least 3'×1½' opening necessitated by previous replacement techniques. The amount of fill removal and replacement is commensurately reduced, and the savings in labor amount to about twelve man-hours per replacement. Of course, some of the labor savings result from increased convenience, as compared with conventional methods, as will be seen.

BRIEF DESCRIPTION OF THE INVENTION

Briefly describing the present invention, a prefabricated flexible sleeve elbow unit is used as the required encased length of the gas service line which passes through the building wall and up through the ground slab. It is simply snaked through a slab hole which is only somewhat larger than its outer diameter of the sleeve, bending to conform with the similarly small underground passage towards and through the building wall opening to be attached to the exterior service line. Its use therefore avoids the need for extensive excavation as is required to install a conventional rigid sleeve elbow.

In general, the elbow unit comprises a flexible inner gas carrier pipe, a flexible outer casing pipe coaxial with and spaced from the inner pipe to provide an annular space between the inner and outer pipes, and a gas vent coupling welded adjacent to one or both ends for attachment of a gas vent pipe or pipes to permit controlled venting to the atmosphere of any leaking gas from within the annular space between the pipes.

Over the major portion of their lengths, both of the flexible inner and outer pipes are preferably made of corrugated stainless steel to provide the required flexibility as well as strength, so that they can be bent sharply on a comparatively small radius. At least the corrugated length of the outer encasement pipe is reinforced with stainless steel braiding to provide rigidity, and to prevent any possible "ballooning" of the corrugated material under any unusual surge of gas service pressure. The inner carrier pipe may, but need not always have the braided wire covering. That is, in larger diameter sizes it is preferable to also provide stainless steel braiding on the inner corrugated pipe length for greater strength.

The inner and outer corrugated pipe lengths have rigid pipe extensions welded on their respective ends, and welded to each other to effectively seal the ends of the annular space between the inner and outer pipes. The gas carrier pipe is longer, so that it projects for attachment at one of its rigid ends to the gas service line, and at the other rigid end to a conventional gas service valve within the building. A sheath of rubber, neoprene, or other non-porous protective material surrounds the entire length of the braided outer corrugated pipe, adapting the sleeve elbow unit for use as a buried fitting and protecting the unit from damage during installation.

In a typical installation, openings for passage of the flexible sleeve elbow through the building wall or foundation at the appropriate below grade elevation, and also through the ground slab within the building, are provided either during the original building construction, or subsequently, the earth fill between these respectively horizontal and vertical openings is tunneled appropriately for passage of the sleeve elbow therethrough. The flexible sleeve elbow is then fed endwise through the passage, and assumes a generally L-shaped contour. If an obstacle, such as a pipe conduit or a foundation pier, initially blocks the path along which it is fed, the elbow unit is flexible enough to follow a more irregular path, "snaking" around the obstacle. It is thus usable in instances where a rigid elbow could not be fitted at all.

The aforementioned vent pipe or pipes are then attached, the passage surrounding the elbow unit is back-filled, and conventional plastic seals are formed around the elbow unit at the openings where it passes through the building wall and ground slab.

DETAILED DESCRIPTION OF PREFERRED EMBODIMENTS

These and other objects, features and applications of the invention will be more fully understood from the following detailed description of preferred embodiments thereof, when read with reference to the accompanying drawings, in which:

FIG. 1 illustrates a flexible sleeve elbow unit in accordance with the invention;

FIG. 2 is an enlarged, fragmentary cross-sectional view of the flexible sleeve elbow unit as seen from line 2—2 in FIG. 1;

FIG. 3 is a fragmentary elevational showing, in cross-section, if a typical building wall and ground slab having openings for installing a gas service therethrough, illustrating steps in practicing the invention; and FIG. 4 is a view of a building similar to that of FIG. 3 but showing a gas service installed in accordance with the invention.

Referring to FIG. 1, a flexible sleeve elbow unit for use in practicing the invention is generally indicated by reference numeral 10. Since it will extend between an underground gas service pipe which lies exterior of the building to an accessible place above a floor within the building, the elbow unit 10 has substantial length; typically 10 feet. At what will be its underground or lower end 10a the projecting rigid end 11a of the gas carrier pipe 11 will be attached to the gas service line 30 (FIG. 4) in conventional manner, and at what will be its interior or upper end 10b the projecting rigid end 11b of the gas carrier pipe will be attached to a standard lubricated plug valve 31 (FIG. 4) using threads 11c on the end 11b. Referring to FIG. 2 it will be seen that the remaining middle length portion of the gas carrier pipe 11, between the rigid ends 11a and 11b thereof, is formed by a length of flexible corrugated metal tubing 11d. The diameter of the gas carrier pipe 11 corresponds with that of the gas service line, which typically may have a diameter of ¾", or 1", or 1½", or 2", depending upon the type of service. Considering that the overall length of the elbow unit 10 in accordance with a preferred embodiment is 10', the length of the flexible, corrugated tubing 11d would be nominally 6'; that of the rigid lower pipe end 11a would be nominally 1'; and that of the rigid upper pipe end 11b would be 3'. The rigid pipe ends 11a and 11b are made of Schedule 40 steel, and the corrugated tubing 11d is made of stainless steel, SAE 316 or 321 for strength and durability. These parts are butt-welded together at leak-tight welded joints 11e, 11f (FIG. 2).

Although in the smaller diameters (e.g., ¾" or 1") it may be omitted, in the larger diameter sizes (e.g., 1½", 2") of the preferred embodiment the corrugated tubing 11d is sheathed in braided stainless steel 12, as seen in FIG. 2. Annular stainless steel rings 13 at each end surround the braiding 12, and the braiding and rings are welded to the ends of the flexible corrugated tubing 11d.

A larger diameter flexible outer casing pipe, generally indicated by reference numeral 15, is coaxial with and surrounds the inner gas carrier pipe 11 to provide an annular space 16 between the pipes for containing, and controlled venting of any gas which leaks through the inner carrier pipe 11. At its lower end 15a the casing pipe 15 also has a rigid steel pipe end 17a which extends over, and surrounds a portion of the projecting rigid pipe end 11b of the gas carrier pipe 11. Respective annular steel spacer rings 18, welded in place to form a gas-tight seal, retain the annular spacing between the inner and outer pipes at both ends of the elbow unit 10, as shown. The remaining middle length portion of the casing pipe 15, between its rigid pipe ends 17a, 17b, is also formed by a length of flexible corrugated metal tubing 17d, preferably stainless steel. Its larger diameter with respect to that of the corrugated metal tubing 11d of the gas carrier pipe 11 provides an annular spacing 16 therebetween. At each of its ends, the corrugated tubing 17d is welded to the respective rigid pipe ends 17a, 17b, which are also preferably made of Schedule 40 steel.

Where the gas carrier pipe 11 is 1½", 2" or larger in diameter, the rigid pipe ends of the outer casing pipe have a diameter 1" larger than the rigid pipe ends of the carrier. In smaller sizes, the rigid pipe ends 17a, 17b of the casing pipe 15 are only ½" larger in diameter than that of the rigid ends 11a, 11b of the gas carrier pipe, which they surround. The corrugated tubing 17d of the casing pipe 15 has a diameter which is 1" larger than the corrugated tubing 11b of the gas carrier pipe where the latter is 1½" or 2" or more in diameter, and is preferably 1½" in diameter for all smaller sized gas carrier pipes 11.

The corrugated tubing 17d of the outer casing pipe 15 is encased in stainless steel braid 19, as seen in FIG. 2. Annular steel rings 20 are welded to the braiding and corrugated tubing at both of its ends, as shown.

The corrugated tubing length of the outer casing pipe 15 is further covered with neoprene sheathing 21, which extends over and beyond the circular rings 20 at each end, as shown in FIG. 2. Of course, instead of neoprene, other non-porous protective material might be used.

Within the lengths of the rigid pipe ends 17a, 17b of the outer casing pipe 15, the annular spacing 16 is vented to the atmosphere via respective vent apertures 22 through the projecting short pipe couplings 23, both of which are one the same side of the elbow unit. As will be understood, the annular space 16 between the gas carrier pipe 11 and the casing pipe 15 extends the full length of the outer casing pipe 15.

Referring now to FIGS. 3 and 4, a gas service pipe installation in accordance with the invention is provided through a foundation wall 25 and a ground slab 26 of a building or the like, the flexible sleeve elbow unit 10 being passed through respective openings 27 and 28 therein, and through the excavation hole 29 through the earthen fill 38 beneath the slab 26. Where smaller sized gas service lines are installed, e.g., ¾" and 1" in diameter, the bend radius of the flexible pipe elbow unit 10 is only 6½", and for larger sizes, e.g., 1½" and 2" diameter gas service pipes, its bend radius is 11½" and 14½", respectively. It will therefore be apparent that the flexible elbow unit 10 can be easily snaked through the apertures 27, 28 and around any obstacles as may be encountered.

It will be understood that the exterior surface of the building foundation wall 25 corresponds with the building line. Of course, where the building does not have a foundation wall, the flexible sleeve elbow simply extends to an exterior location beyond the building line.

As seen in FIG. 4, steel pipe lengths 27a, 28a of enlarged diameter are positioned and grouted in place within the respective openings 27, 28 through the building wall 25 and floor slab 26 where the unit 10 will pass when being positioned. The elbow unit 10 is sealed within the pipes 27a, 28a, as by mastic sealing material 27b, 28b, as seen in FIG. 4. Where it emerges above the ground slab 26, the rigid end 17b of the unit is surrounded by a reinforced nylon pipe brace 29. Alternatively, and although not shown, a conventional insulating plate and steel brace might be used.

As previously mentioned, a conventional lubricated plug valve 31 is attached to the upper end 11b of the gas carrier pipe 11, and its lower rigid pipe end 11a is attached to the gas service line 30, both in conventional manner.

The elbow unit 10 is oriented so that the vent coupling 23 on its upper end faces the interior of the building wall 25, at which elevation an opening 34, having a steel pipe length 34a of enlarged diameter therein, is made through the building wall 25. The primary gas vent pipe 35 from the annular space 16 is attached to coupling 23 and passes through the wall opening. A conventional vent cap 36 is attached at the outer end of vent pipe 35 where it projects outside the building. Of course, the pipe length 34a is grouted in place in conventional manner, and the vent pipe 35 is sealed within the pipe length 34a using a mastic sealing material 37, as indicated in FIG. 4.

An auxiliary gas vent pipe 32 may also be attached to project upwardly to above ground from the lower end pipe coupling 23, which faces upwardly when the elbow unit 10 is installed as seen in FIG. 4. As indicated in FIG. 3, the vent pipe 32 is easily installed via the excavation hole 33, which is also utilized for access to the connection between the elbow unit end and the service line 30.

In certain applications the lower end pipe 32 may be omitted, so that all of any escaping gas from the gas carrier pipe within the annular space 16 will be vented only through the upper vent pipe 35 to the atmosphere, via vent cap 36.

From the foregoing description, it will be understood that the flexible elbow unit 10 is particularly useful where a conventional rigid sleeve elbow (not shown) in a gas service line is to be replaced. That is, the opening 28 through the ground slab 26 need be only about one-foot in diameter, and the amount of excavation of fill therebelow to form the elbow unit passage hole 29 will be a minimum. After the elbow unit 10 is placed, the required back filling of the excavation 29, and the cementing in of the ground slab opening 28 is also made easier.

Thus, a flexible sleeve elbow unit and method of installation has been described which achieve all of the objects of the invention.

What is claimed is:

1. The method of installing a gas service line leading from an underground exterior location past the building line of a building or the like and upwardly through a ground slab to a location within the building, comprising the steps of providing a small opening through said ground slab in the vicinity of said exterior location of said gas service line, providing a narrow passage in the earthen fill between said ground slab opening and said gas service line, snaking a flexible sleeve elbow unit downwardly through said ground slab opening and said passage and thence horizontally past said building line, said flexible sleeve elbow unit comprising an inner corrugated gas service pipe having respective projecting rigid pipe upper end and lower end portions, and an outer casing pipe comprising a corrugated length portion surrounding said inner corrugated gas carrier pipe to provide an annular spacing therebetween, and respective rigid pipe upper and lower end portions attached in gas-tight sealing relationship to the respective of said upper and lower rigid pipe end portions of said gas carrier pipe, attaching said projecting lower end portion of said gas carrier pipe to said gas service line at said underground exterior location of the building with at least said rigid lower end portion of said casing pipe projecting exteriorly beyond said building line, said upper end portion of said gas carrier pipe and at least a portion of said rigid upper end portion of said rigid upper end portion of said casing pipe then projecting above said ground slab at said location within said building, securing said elbow unit in place by filling said passage with filling material within the area thereof which surrounds said elbow unit and closing said slab opening around said elbow unit, and providing a gas vent extending from said annular space to the atmosphere exterior of said building.

2. The method of installing a gas service line according to claim 1, wherein said building further includes an exterior foundation wall substantially on said building line, and said method further comprises snaking said flexible elbow unit through a horizontally disposed opening in said foundation wall adjacent to said gas service line.

3. A gas service line installation in a building or the like having an underground exterior foundation wall and a horizontal ground slab within said building adjacent to said wall, comprising an underground gas service line leading substantially horizontally to an exterior location adjacent to said wall, a flexible sleeve elbow unit comprising an inner corrugated gas carrier pipe having respective projecting rigid pipe upper end and lower end portions and an outer corrugated casing pipe surrounding said inner corrugated gas carrier pipe to provide an annular spacing therebetween, said outer corrugated casing pipe having respective rigid pipe upper end and lower end portions attached by gas tight sealing means to the respective of said rigid pipe upper end and lower end portions of said gas carrier pipe, said flexible sleeve elbow unit including said rigid pipe lower end of said casing pipe extending horizontally through said wall and said projecting rigid pipe lower end of said gas carrier pipe being attached in gas flow communication with said gas service line at said exterior underground location, said flexible sleeve elbow unit including said rigid pipe upper end of said casing pipe extending upwardly through said building ground slab, and gas-leakage vent means extending from said annular space to the atmosphere exterior of said building.

* * * * *